A. P. MERRILL.
PLOW AND PULVERIZER.
APPLICATION FILED MAY 7, 1920.
1,392,845. Patented Oct. 4, 1921.
3 SHEETS—SHEET 1.
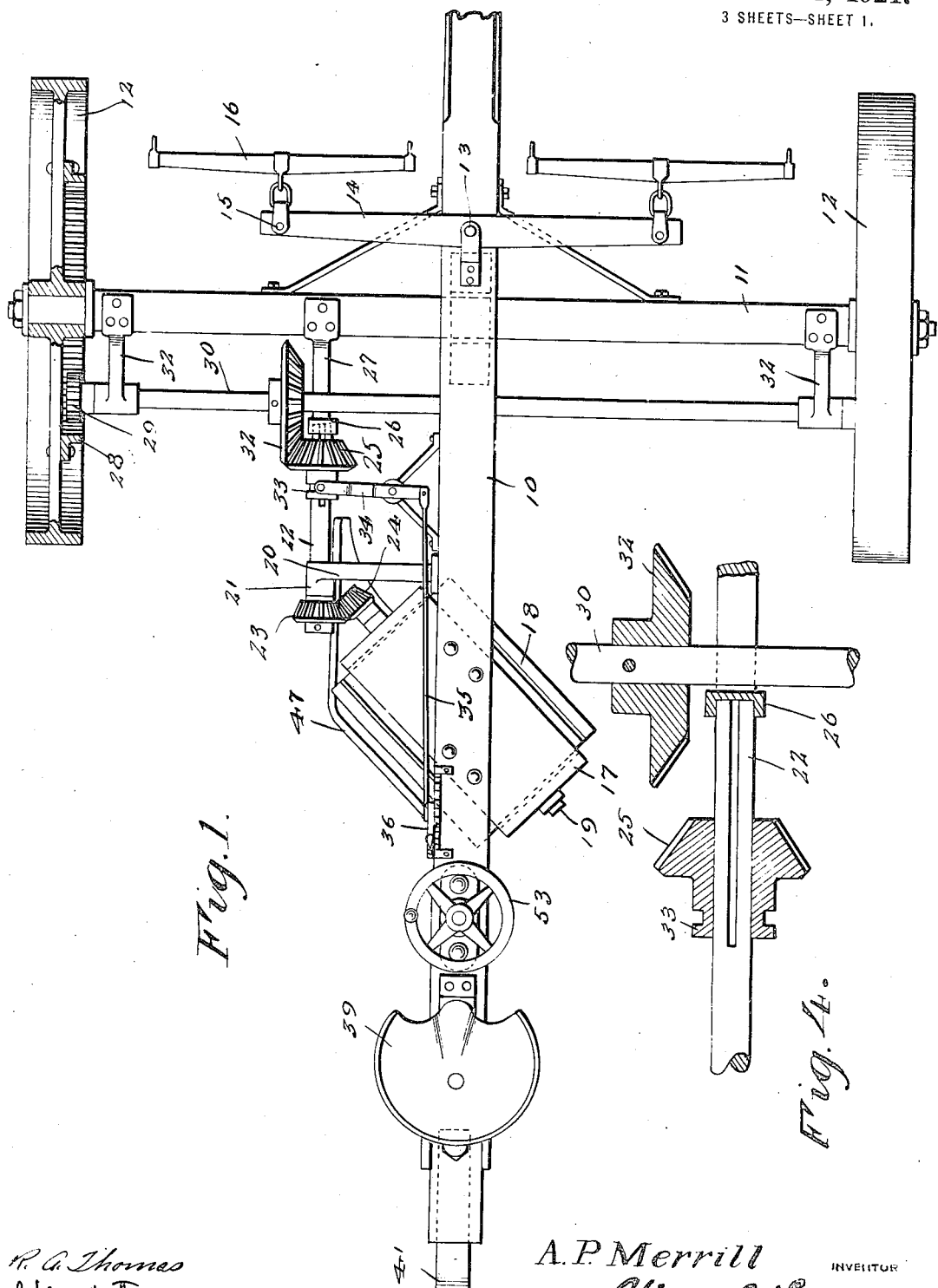

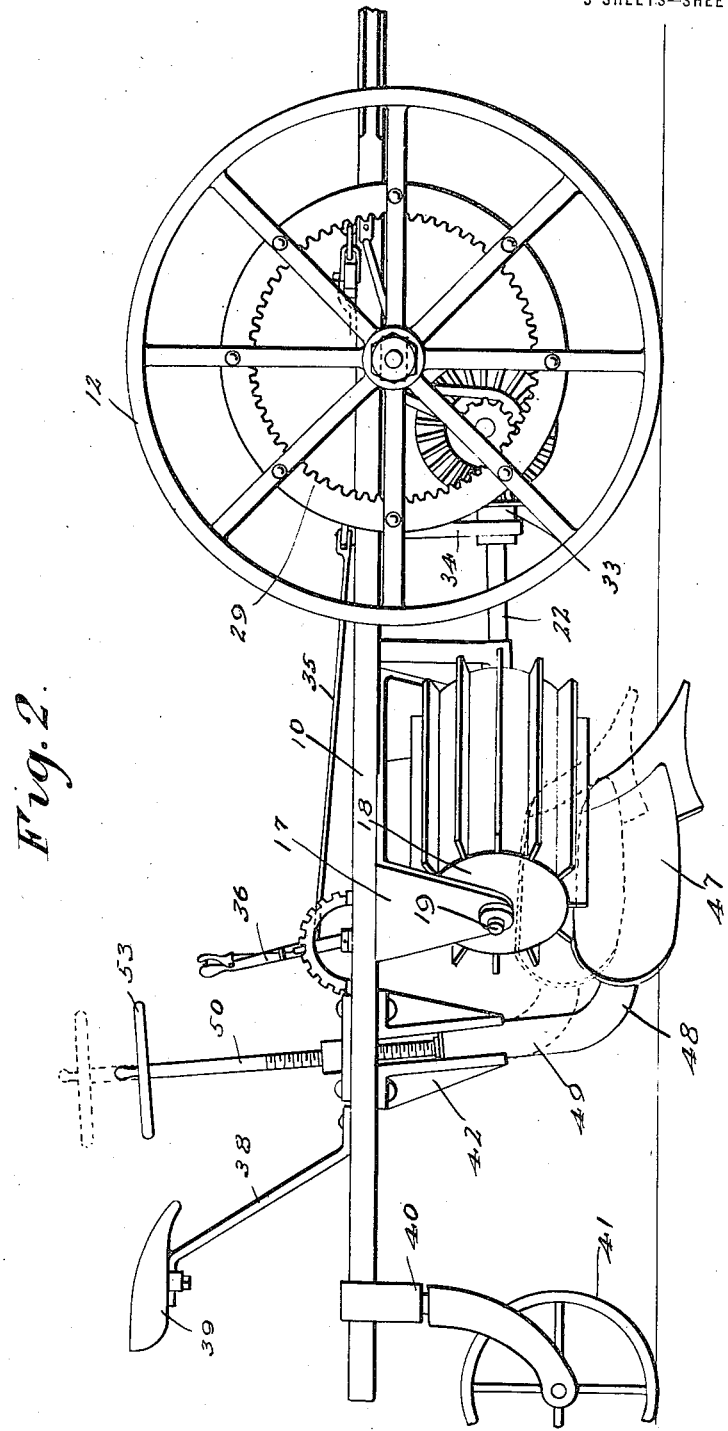

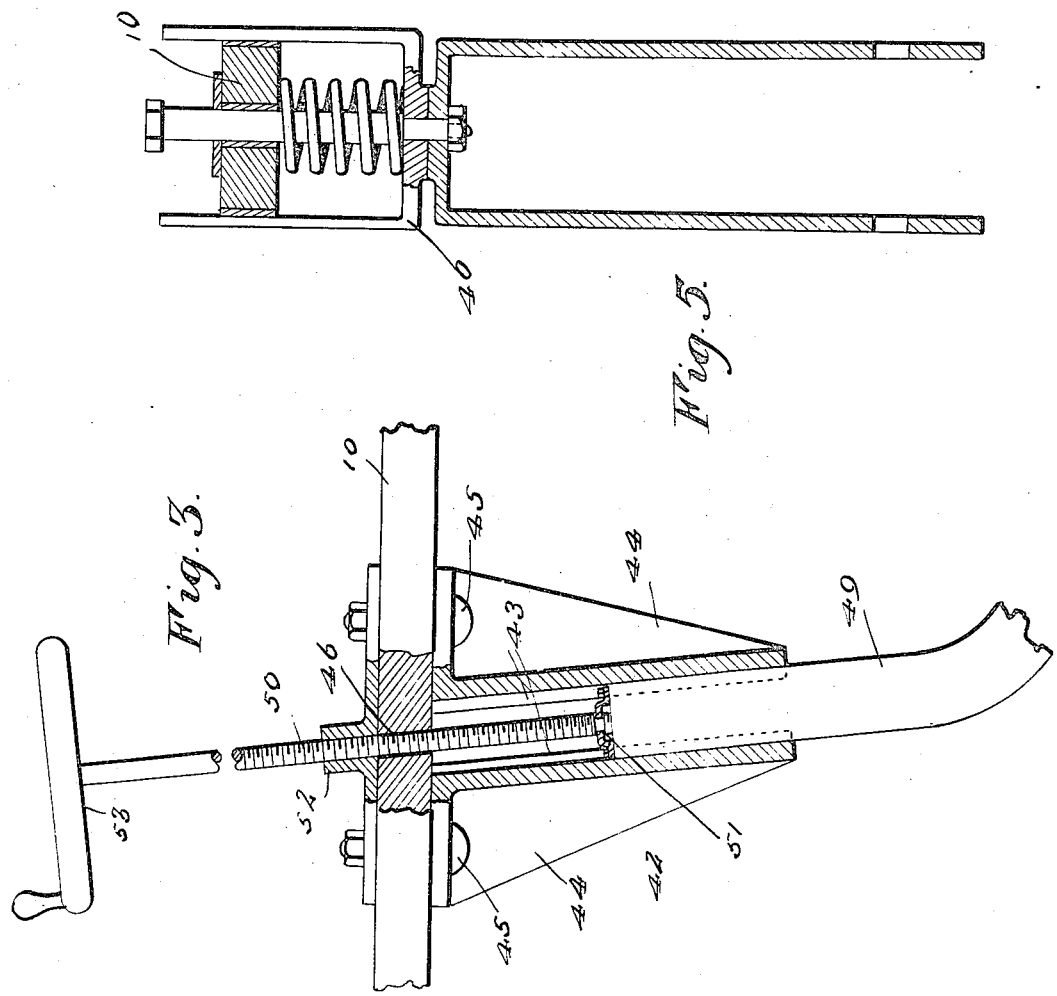

UNITED STATES PATENT OFFICE.

AYRES PHILLIPS MERRILL, OF NATCHEZ, MISSISSIPPI.

PLOW AND PULVERIZER.

1,392,845.  Specification of Letters Patent.  Patented Oct. 4, 1921.

Application filed May 7, 1920. Serial No. 379,607.

*To all whom it may concern:*

Be it known that I, AYRES P. MERRILL, a citizen of the United States, residing at Natchez, in the county of Adams and State of Mississippi, have invented new and useful Improvements in Plows and Pulverizers, of which the following is a specification.

This invention relates to agricultural implements, particularly to a device for breaking up and pulverizing the ground, and has for its object the provision of a combined plow and pulverizer, the device including a wheeled frame by which is carried the plow and within which is journaled a rotary cutter member located above and to the rear of the plow and driven by the passage of the device over the ground, the cutter member rotating very rapidly and serving to break up or pulverize the earth thrown up by the plow.

An important object is the provision of a device of this character in which is provided novelly constructed means for elevating the plow out of its ground engaging position when the device is being moved to and from the field where its operation is desired.

An additional object is the provision of a device of this character which will be comparatively simple in construction, highly efficient in use, positive in action, durable in service, and a general improvement in the art.

With the above and other objects and advantages in view, the invention consists in the details of construction to be hereinafter more fully described and claimed, and illustrated in the accompanying drawings in which—

Figure 1 is a plan view of the device, one wheel and its associated parts being shown in section, Fig. 2 is a side elevation with the plow shown in ground engaging position, Fig. 3 is a detail sectional view showing the plow adjusting means, Fig. 4 is a fragmentary plan view showing the means for throwing the cutter out of gear, Fig. 5 is a detail sectional view showing the mounting of the rear wheel.

Referring more particularly to the drawings, the numeral 10 designates a beam to which is secured an axle 11 having wheels 12 journaled upon the ends thereof. This beam has pivoted thereon, as shown at 13, a double tree 14 upon which are mounted, as at 15, swingle trees 16 to which the horses or other draft animals are hitched, the forward end of the beam 10 constituting a tongue.

Secured upon the beam and extending below the same, are brackets 17 between which is journaled a rotatable cutter designated broadly by the numeral 18 which has its shaft 19 journaled through the brackets. This cutter has its axis disposed at an angle of 45° with respect to the beam 10, as clearly shown in Fig. 1.

In order that this cutter 18 may be driven, I provide a pair of brackets 20 secured upon the beam and projecting below and to one side thereof and terminating in bearings 21. Journaled through the bearings 21 is a short shaft 22 upon one end of which is secured a gear 23 meshing with a gear 24 secured upon the adjacent end of the shaft 19. Secured upon the shaft 22 intermediate its ends, is a bevel pinion 25. The other end of the shaft 22 is journaled within a socket 26 formed in a collar 27 secured upon the axle 11.

Secured upon one wheel 12 is an internal gear 28 which meshes with a pinion 29 secured upon one end of a shaft 30 which is journaled through bearing brackets 31 secured to the axle 11. The shaft 30 also carries a bevel gear 32 meshing with the bevel pinion 25. Formed on the pinion 29 is a grooved collar 33 which is engaged by a forked lever 34 pivoted upon a suitable bracket and having connected therewith a link 35 carrying an operating handle 36 movable over a segmental rack, this construction permitting the pinion 25 to be moved into or out of mesh with the gear 32 so as to render the cutter 18 inoperative when desired.

Mounted upon the top of the beam 10 at the rear portion thereof, is an upwardly inclined support 38 upon which is secured a seat 39. Depending from the rear end of the beam 10 are brackets 40 between which is journaled a wheel 41 which supports the rear end of the structure.

Secured upon the underside of the beam 10 to the rear of the cutter 18, is a bracket 42 formed as a hollow guide 43 reinforced by webs 44 and bolted onto the beam, as shown at 45. The opening within the guide 43 is rectangular in cross section and communicates with an opening 46 in the beam. The numeral 47 designates a plow blade 10 secured upon the forward end of an annular standard 48 which has its shank 49 slidably mounted within a guide 43. I further provide a screw 50 which has its lower end swivelly connected with the upper end of the shank 49, as shown at 51, and which is threaded through the plate 52 secured upon the top of the beam. At its upper end this screw carries a hand wheel 53. By this construction it will be seen that the plow blade may be adjusted vertically so as to be out of engagement with the ground traveled over, when desired.

The operation of the device is as follows.

When it is desired to transport the device from one place to another, as in going to or coming from a field, the handle 36 is manipulated to withdraw the pinion 25 from mesh with the gear 32, and the screw 50 is operated to elevate the plow blade 47. In order to place the device in operation, the screw 50 is manipulated to lower the blade 47 so that it will dig into the ground. It is also necessary to move the handle 36 to throw the pinion 25 in gear. When the device is then drawn over the ground, the earth thrown up by the plow blade 47 will be engaged by the cutter 18 and will be efficiently and thoroughly broken up or pulverized thereby. Owing to the relative sizes of the gears it will be apparent that the cutter 18 will be rotated at a high speed.

From the foregoing description and a study of the drawings it will be apparent that I have thus provided a simply constructed and easily operated plow and pulverizer which is easily manipulated and controlled and which will efficiently perform all the functions for which it is intended.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A device of the character described comprising a wheeled frame provided with draft means, a plow blade carried by the frame, a diagonally disposed horizontally arranged rotary cutter journaled upon the frame forwardly of and above the plow, and means for rotating said cutter, said means comprising a gear mounted upon one of the wheels supporting the frame, and a train of gearing connected with said gear and cutter.

2. A device of the character described comprising a beam having one end constituting a tongue, an axle secured transversely of the beam and carrying wheels, a plow blade mounted upon the lower side of the beam and vertically adjustable whereby to be moved into or out of engagement with the ground, a diagonally extending horizontally arranged rotary cutter journaled below the beam above and to the front of the plow, and means driven by one of said wheels for rotating said cutter.

3. A device of the character described comprising a wheeled frame provided with draft means, a plow blade carried by and extending below the frame, a diagonally disposed horizontally arranged rotary cutter journaled below the frame in advance of and above said plow blade, a shaft journaled transversely of the frame and driven by one of the wheels thereof, a beveled gear on said shaft, a counter shaft extending longitudinally of the frame and connected by gearing with said rotary cutter, a gear splined upon said counter-shaft and movable into or out of mesh with said first named gear whereby to throw the cutter into or out of operation.

In testimony whereof I affix my signature.

AYRES PHILLIPS MERRILL.